United States Patent
Murakami

(10) Patent No.: US 6,347,267 B1
(45) Date of Patent: Feb. 12, 2002

(54) ON-VEHICLE CONTROLLER FAILURE DIAGNOSING METHOD AND APPARATUS

(75) Inventor: Takanobu Murakami, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/125,370

(22) PCT Filed: Feb. 19, 1997

(86) PCT No.: PCT/JP97/00449

§ 371 Date: Aug. 17, 1998

§ 102(e) Date: Aug. 17, 1998

(87) PCT Pub. No.: WO97/31254

PCT Pub. Date: Aug. 28, 1997

(30) Foreign Application Priority Data

Feb. 20, 1996 (JP) .............................................. 8-055367

(51) Int. Cl.⁷ .......................... F02D 45/00; G05B 15/00
(52) U.S. Cl. .......................... 701/35; 701/29; 701/34; 73/116; 73/117.2; 73/117.3
(58) Field of Search .............................. 701/35, 34, 29; 73/116, 117.2, 117.3; 340/453, 455, 438, 439

(56) References Cited

U.S. PATENT DOCUMENTS 5,450,321 A * 9/1995 Crane .......................... 701/35
5,506,773 A * 4/1996 Taakaba et al. ............... 701/35

FOREIGN PATENT DOCUMENTS

| JP | 59-148847 | 8/1984 |
| JP | 3-028044 | 2/1991 |
| JP | 7-172251 | 7/1995 |

* cited by examiner

Primary Examiner—William A. Cuchlinski, Jr.
Assistant Examiner—Yonel Beaulieu
(74) Attorney, Agent, or Firm—Sidley & Austin

(57) ABSTRACT

Even if a power source is cut OFF while a failure is present and then the power source is turned back ON with the failure uncorrected, the details of the same failure will not be recorded as failure history data, thus permitting correct failure history data to be stored. In an on-vehicle controller failure diagnosing method in which, if a vehicle failure happens, the time at which the failure happened and the details of the failure are stored as failure history data, the details of a detected failure are stored as failure history data only if the details of the failure which existed when the power source of the on-vehicle controller was cut OFF are different from the details of the failure detected during a failure diagnosis carried out when the power source is turned back ON. Further, it is determined, during the failure diagnosis carried out after the power source of the on-vehicle controller is turned ON, whether the cause of a failure which existed when the power source was cut OFF has been eliminated, and if the cause is found to be eliminated, then it is determined that the failure which existed when the power source was cut OFF has been completely corrected, and the result is stored as failure history data.

11 Claims, 2 Drawing Sheets

ON-VEHICLE CONTROLLER FAILURE DIAGNOSING METHOD AND APPARATUS

FIELD OF THE INVENTION

The present invention relates to a failure diagnosing method and apparatus for a controller mounted on a vehicle and, more particularly, to a method and apparatus adapted to prevent failure history data from being stored twice if a failure, which existed when a power source was cut OFF, has not yet been corrected.

BACKGROUND ART

A controller mounted on a vehicle or the like (hereinafter referred to as an "on-vehicle controller") has been able to provide a higher function owing to the progress in the technologies in the semiconductor field, microcomputer field, and the like. On the other hand, the higher function has lead to a prolonged time for identifying the cause of a failure. An extended interruption of operation of the on-vehicle controller due to a failure means lower operating efficiency. Hence, there has been a strong demand from many users for achieving a shorter time for identifying the causes of failures. For this reason, more on-vehicle controllers employing microcomputers or the like are having built-in failure diagnosing functions.

According to a conventional failure diagnosing method, an on-vehicle controller is monitored at all times for a failure. If a failure occurs, then the cause or location of the failure is determined primarily by the failure detection signals received from mounted units, sensors, etc.; the failure detection signals issued from failure-detecting circuits; and the failure signals detected by the on-vehicle controller using software, and an operator is notified of the result by means of a display unit or the like. The operator takes a corrective action for the failure, then turns the power source of the vehicle back ON to check whether the failure has been corrected.

Further, in order to prevent a failure from taking place, some on-vehicle controllers record the history of the operating conditions (such as temperatures, pressures, and rotational speeds), the load conditions of the mounted units when they are operated, and the history of the causes and locations of failures that have happened in the past; and further use such history data to determine the tendency of failures, to carry out failure diagnosis. Stored in a history data storing area of the on-vehicle controller at predetermined timings are such history data as the oil temperature, speed, oil pressure, lubricant level, etc., of an engine; the oil temperature and lubricant level of a transmission; clutch operating time; ambient temperature; and atmospheric pressure. At the same time, the time at which the data was stored is also recorded. The data indicating the cause or location of a failure, when the failure happened, is stored together with the time at which the failure took place. Based on the history data, the tendency of the load state of each unit of the vehicle is determined to predict the service life thereof, or the frequency or tendency of the occurrence of failures is determined. Notifying the operator of those determined results enables the operator to carefully check a certain unit or replace a part, the service life of which is expected to expire soon, during periodic inspection, thus permitting preventive maintenance.

The on-vehicle controller carries out failure diagnosis whenever the power source is turned ON to make sure that the vehicle is in normal condition before allowing the functions to be put in operation. When the power source of the on-vehicle controller is turned OFF with a failure left uncorrected, the power source is frequently turned back ON before the cause of the failure has been removed. This causes the on-vehicle controller to decide that the failure from the same cause has occurred again when it carries out the diagnosis immediately after the power source thereof is turned back ON or after it is put in operation; hence, the time of the occurrence of that failure and the cause of the failure, etc. are stored again. Thus, the data on the same failure is stored twice since the power source was cut OFF with the failure left uncorrected. This poses a problem in that the on-vehicle controller fails to store necessary failure history data, preventing proper preventive maintenance from being implemented.

SUMMARY OF THE INVENTION

The present invention has been made with efforts focused on solving the problem described above, and it is an object of the invention to provide an on-vehicle controller failure diagnosing method and apparatus that make it possible, even if the power source of the on-vehicle controller is cut OFF with the presence of a failure and the power source is turned back ON with the failure uncorrected, to store proper history data without doubly recording the failure history data on the same failure.

According to a first aspect of the present invention, there is provided an on-vehicle controller failure diagnosing method for storing, if a vehicle failure happens, the time at which the failure happened and the details of the failure as failure history data; wherein the details of a failure, which occurred when the power source of the on-vehicle controller was cut OFF, are compared with the details of a failure detected by a failure diagnosis after the power source was turned back ON, and it is determined that the failure detected by the failure diagnosis after the power source was turned ON is a new failure only if the comparison result indicates that the details of the two failures are different, and the details of the detected failure are stored as failure history data.

Thus, if the details of the failure that occurred when the power source of the on-vehicle controller was cut OFF coincide with the details of the failure detected during the failure diagnosis carried out after the power source was turned back ON, then the on-vehicle controller determines that the corrective action for the failure that took place when the power source was cut OFF has not been completed or implemented; or it decides that a new failure has occurred only if the details of the foregoing two failures are different, and the details of the new failure are stored as failure history data. As a result, correct failure history data can be stored and hence accurate prediction of the tendency of failures or service lives can be accomplished, permitting highly accurate preventive maintenance.

According to a second aspect of the present invention, there is provided an on-vehicle controller failure diagnosing method for storing, if a vehicle failure happens, the time at which the failure happened, and the details of the failure are stored as failure history data, wherein it is determined, during a failure diagnosis carried out after a power source of the non-vehicle controller is turned back ON, whether the cause of a failure which existed when the power source was cut OFF has been eliminated; if the cause is found to be eliminated, it is determined that the failure which existed when the power source was cut OFF has been completely eliminated and the cause of the failure is stored as failure history data.

Thus, during failure diagnosis after the power source of the on-vehicle controller is turned ON, it is checked whether the cause of a failure, which existed when the power source was cut OFF, has been eliminated, and, if the cause is found to be eliminated, it is determined that the repair for the failure which existed when the power source was cut OFF has been completed, and the result is stored as failure history data. Hence, correct failure history data is stored and the tendency of failures and service lives can accordingly be predicted properly, permitting highly accurate preventive maintenance.

According to a third aspect of the present invention, there is provided an on-vehicle controller failure diagnosing apparatus equipped with failure detection means for detecting a failure of a vehicle and a means for storing failure history data for storing the details of the detected failure as failure history data, the on-vehicle controller failure diagnosing apparatus further including means for judging whether or not to store failure history data, which compares the details of a failure, detected by a failure diagnosis by the failure detection means, after a power source of the on-vehicle controller was turned back ON, with the details of a failure which have been stored in the means for storing failure history data and which existed when the power source was cut OFF, determines that the repair for the failure has not been completed if the details of the two failures coincide, and stores the details of the foregoing detected failure in the means for storing failure history data only if the details of the two failures are different.

Thus, the details of a failure, which existed when the power source of the on-vehicle controller was cut OFF, are stored in the means for storing failure history data; and the means for judging whether or not to store failure history data determines whether the details of a failure detected by a failure diagnosis, after a power source is turned ON, coincide with the details of the failure which have been stored in the means for storing failure history data and which existed when the power source was cut OFF. If the details of the two failures coincide, then the means for judging whether or not to store failure history data decides whether the repair for the failure which existed when the power source was turned OFF has not been completed, whereas if details of the two failures do not coincide, it decides that a new failure has occurred and stores the details of the failure as failure history data. As a result, correct failure history data can be stored and the tendency of failures and service lives can accordingly be predicted properly, permitting highly accurate preventive maintenance.

BEST MODE FOR CARRYING OUT THE INVENTION

A first embodiment in accordance with the present invention will be described in detail with reference to FIGS. 1, 2, and 3.

Figure 1:
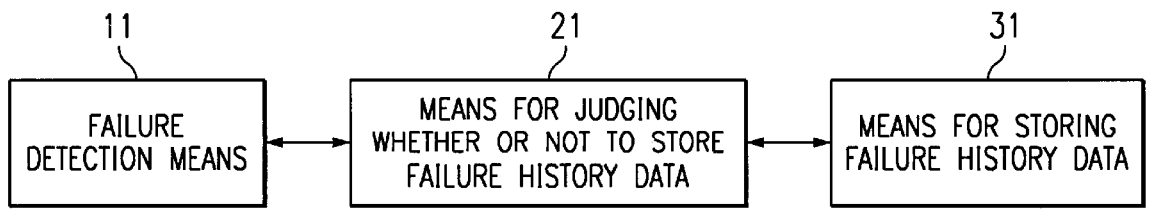
FIG. 1 is a block diagram illustrating the functions of an on-vehicle controller failure diagnosing apparatus in accordance with the present invention.

As shown in FIG. 1, a failure detection means 11 of the embodiment carries out the failure diagnosis of an on-vehicle controller to detect a failure and issues a failure signal indicative of the details of the detected failure to a means 21 for judging whether or not to store failure history data. A means 31 for storing failure history data stores the data on the details of failures, which have occurred, together with the data on the time when the failures took place, in the order in which the failures occurred. The means 21 for judging whether or not to store failure history data receives the details of a failure corresponding to the failure signal given by the failure detection means 11 and the details of the failure stored in the means 31 for storing failure history data. The means 21 for judging whether or not to store failure history data compares these both pieces of data on the details of the failures and, if it determines that the details of the failure detected by the failure detection means 11 should be stored as failure history data, then it writes the data on the failure details to the means 31 for storing failure history data.

Figure 2:
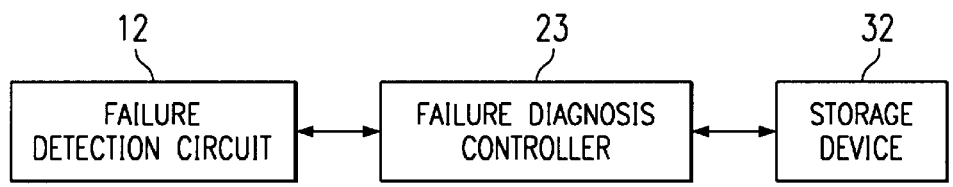
FIG. 2 is a block diagram illustrating the hardware configuration of the on-vehicle controller failure diagnosing apparatus in accordance with the present invention.
Figure 3:
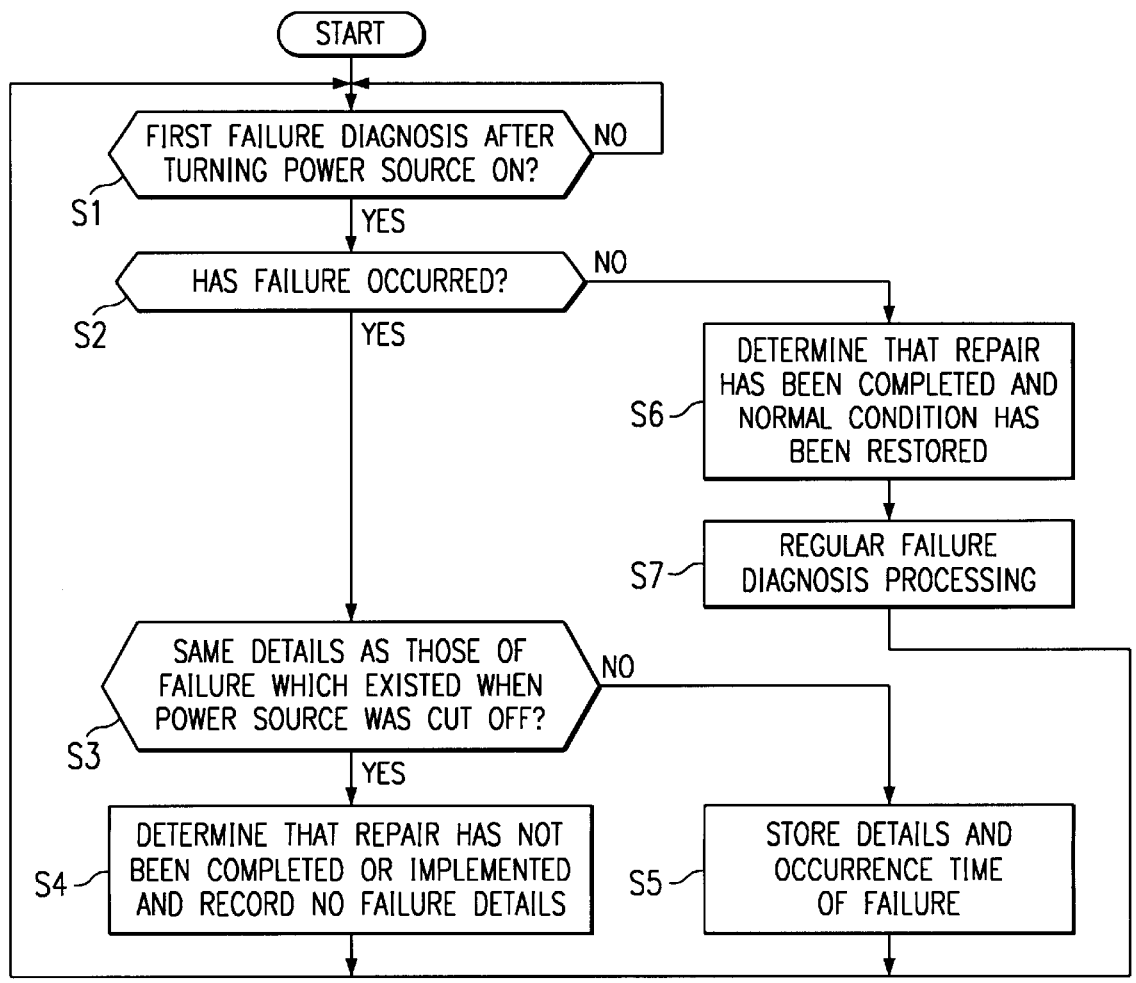
FIG. 3 is a processing flowchart of a first embodiment of the failure diagnosing apparatus in accordance with the present invention.

FIG. 2 illustrates the functional configuration shown in FIG. 1 in terms of a hardware configuration. A failure detecting circuit 12 corresponds to the failure detection means 11 of FIG. 1; it issues status signals or failure detection signals related to various failure factors of the on-vehicle controller to a failure diagnosis controller 23, or it sends out the status signals to the failure diagnosis controller 23, according to the failure diagnosis command signals from the failure diagnosis controller 23. To be more specific, the failure detecting circuit 12 is made up of detecting sections corresponding to failure factors. For instance, the failure detecting circuit 12 is provided primarily with a line voltage failure detecting section which issues a line voltage failure signal if line voltage is not within a predetermined range, a sensor failure detecting section which issues a sensor failure signal if a sensor fails, an input section for a driving circuit output voltage value obtained when a drive command signal is supplied to the driving circuit of a brake solenoid for turning ON/OFF a brake, and an input section for a clutch system failure signal.

The failure diagnosis controller 23 is constituted mainly by the functions of the failure detection means 11 and the means 21 for judging whether or not to store failure history data; it is composed, for example, of a computer system based on a microcomputer or the like. The failure diagnosis controller 23 finds the occurrence of a failure upon receipt of the failure signal of the failure detecting circuit 12, such as the line voltage failure signal and the sensor failure signal; it also receives status signals from the failure detecting circuit 12 based on the failure diagnosis command signals issued to check whether particular failure factors have appeared and it determines whether failures have taken place by referring to the status signals. For example, the failure diagnosis controller supplies the drive command signal to the driving circuit of the brake solenoid and measures the time required for the output voltage value of the driving circuit to reach a predetermined value or greater so as to determine whether the brake solenoid driving circuit has failed according to the length of the measured time, and if it decides that a failure has occurred, then it further decides whether the data on the details of the failure should be stored, and if it decides that it should store the data, then it writes the failure details data together with the data on the time when the failure occurred to a storage device 32. The storage device 32 is the memory for storing the failure details data and the data on the time at which a failure occurred; it is composed of a nonvolatile random access memory generally known as RAM. The storage device 32 may alternatively be constituted by a battery backed up complementary metal-oxide-semiconductor RAM (CMOS-RAM), an integrated circuit (IC) card memory, or a hard disk device.

The operation of the embodiment will now be described in conjunction with the processing flowchart shown in FIG. 3. The processing steps below are implemented by the means 21 for judging whether or not to store failure history data of the failure diagnosis controller 23. Each of the steps of the processing flowchart are denoted by reference characters S followed by a step number.

(S1) After the power source is turned ON, the means 21 for judging whether or not to store failure history data determines whether a first failure diagnosis is being carried out, and, if it is the first failure diagnosis, then it proceeds to S2, or if not, then it repeats S1 and waits.

(S2) The means 21 for judging whether or not to store failure history data determines whether a failure has occurred and, if a failure has occurred, then it proceeds to S3 or, if not, it proceeds to S6. Whether a failure has occurred is determined by checking whether a failure signal corresponding to a failure factor detected by the failure detection means 11 during the failure diagnosis has been received.

(S3) The means for judging whether or not to store failure history data reads the data on the details of a failure, which was present when the power source of the on-vehicle controller was cut OFF, from the means 31 for storing failure history data and compares it with the failure details corresponding to the failure signal received from the failure detection means 11, in order to decide whether the two details coincide; if they coincide, then it goes to S4, or if not, then it goes to S5.

(S4) The means for judging whether or not to store failure history data decides that the repair of the failure that was present when the power source was cut OFF has not been completed or implemented, and it does not store the details of the failure detected when the power source was turned ON; then it goes back to S1 to repeat the processing.

(S5) The means 21 for judging whether or not to store failure history data decides that the failure detected when the power source was turned ON is a new failure, different from the one that was present when the power source was cut OFF, and it writes the failure details and the time at which the failure occurred to the means 31 for storing failure history data; then it goes back to S1 to repeat the processing.

(S6) The means for judging whether or not to store failure history data decides that the repair for the failure that occurred when the power source was cut OFF has been completed and the normal condition has been restored, and it proceeds to S7.

(S7) The means for judging whether or not to store failure history data carries out regular failure diagnosis processing; more specifically, if a new failure has occurred, then it writes the details of the failure and the time at which the failure occurred to the means 31 for storing failure history data before it goes back to S1 to repeat the processing.

The diagnosing method for the first failure diagnosis after the power source is turned ON in S1 is different depending on the failure factor; it is categorized according to the need for the failure diagnosis controller 23 and the operator or the like to take action in order to determine that the failure factor has been removed. For instance, in the case of the foregoing line voltage failure detection, whether the normal condition has been restored can be checked immediately after the power source is turned ON even if the failure diagnosis controller 23 and the operator or the like takes no action. Such a factor is categorized as Class A because this factor being normal provides a basis for diagnosing other failure factors.

Further, a failure or the like of the brake solenoid driving circuit is checked by turning ON/OFF an associated command signal and by checking whether the normal condition has been restored according to the then output state signal. This type of factor cannot be checked unless the failure diagnosis controller 23 and the operator or the like takes some action; this factor is categorized as Class B. Some factors classified as B require that all factors of Class A be back to normal.

Further, whether the failure of the clutch system, for example, has been corrected can be checked only by actually driving the vehicle. This type of factors requires specific conditions in addition to the conditions of Class B; they are categorized as Class C. Some factors of Class C are based on the assumption that all factors of Class A have been set back to normal. Thus, the first failure diagnosis after the power source is turned ON is implemented at the timings that correspond to the classes of the failure actors.

If the factor of the failure that has taken place is the same as that observed when the power source was cut OFF, then it is determined that the repair has not been completed or implemented, and the failure details are not stored as the failure history data; whereas, if it is a different factor, then it is determined that a new failure has occurred, and the failure details are stored as the failure history data, or if no failure factor is found, then it is determined that the normal condition has been restored.

Accordingly, if the power source of the on-vehicle controller is turned ON without completing or implementing the repair of a failed part, the details of the uncorrected failure are not stored as the failure history data; hence, correct failure history data can be stored. As a result, accurate prediction of the tendency of failures or service lives can be accomplished, leading to highly accurate preventive maintenance.

Figure 4:
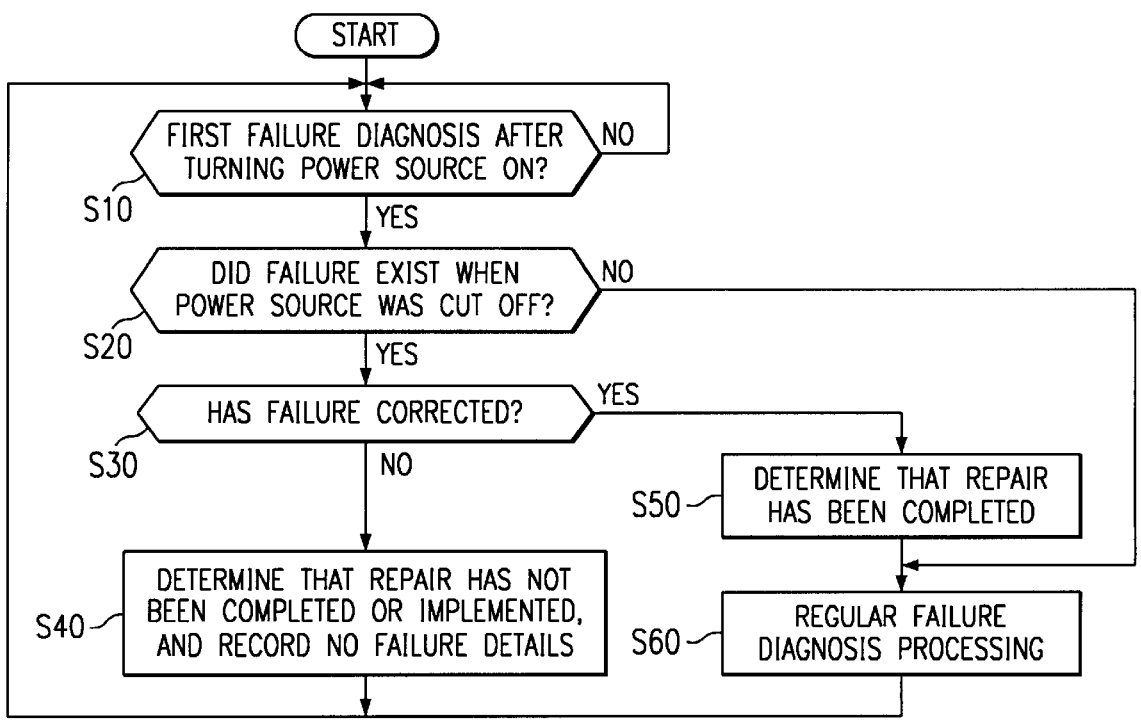
FIG. 4 is a processing flowchart of a second embodiment of the failure diagnosing apparatus in accordance with the present invention.

A second embodiment in accordance with the present invention will now be described in detail with reference to FIGS. 1, 2, and 4.

In this embodiment, if a failure factor occurred when the power source was cut OFF, it is determined whether the failure factor has been set back to normal by the failure diagnosis immediately after the power source is turned ON. The functional configuration and the hardware configuration in this embodiment are the same as those shown in FIG. 1 and FIG. 2; hence, the explanation thereof will be omitted. It should be noted, however, that the method, in which a means 21 for judging whether or not to store failure history data determines whether the details of a failure detected by a failure detection means 11 should be stored as the failure history data, is different from that in the first embodiment.

The operation of the embodiment will be explained in conjunction with the processing flowchart of FIG. 4.

(S10) The means 21 for judging whether or not to store failure history data determines, after the power source is turned ON, whether the diagnosis is the first failure diagnosis; if the diagnosis is the first failure diagnosis, then it proceeds to S20, or if not, then it repeats S10 and waits.

(S20) The means for judging whether or not to store failure history data determines whether a failure was present when the power source was cut OFF according to the failure history data stored in a means 31 for storing failure history data; if a failure was present, then it proceeds to S30, or if not, then it proceeds to S60.

(S30) The means for judging whether or not to store failure history data determines whether the failure that was present when the power source was cut OFF has been corrected; then it proceeds S50, or if not, then it proceeds to S40.

(S40) The means for judging whether or not to store failure history data determines that the repair for the failure that was present when the power source was cut OFF has not been completed or implemented, and it goes back to S10 to repeat the processing.

(S50) The means for judging whether or not to store failure history data determines that the repair for the failure that was present when the power source was cut OFF has been completed and it stores the result as the failure history data before it proceeds to S60.

(S60) The means for judging whether or not to store failure history data carries out regular failure diagnosis processing; more specifically, if a new failure has occurred, then it writes the details of the failure and the time at which the failure occurred to the means 31 for storing failure history data before it goes back to S10 to repeat the processing.

The determination made in S30, whether the failure that had occurred when the power source was cut OFF has been corrected, is based on a more stringent standard than the standard for determining whether a failure has occurred in the regular failure diagnosis processing. For example, if it is determined that a failure has taken place when the failure state has continued for a predetermined time t, or more, then the normal condition must continue for a predetermined time $t_2$ (where $t_2 > t_1$) or more to determine that the failure has been corrected. Thus, since the conditions for determining that the failure has been corrected are stringent, there will be no chance of the same failure factor, which was present but not repaired completely when the power source was cutt OFF, being stored twice as failure history data when the power source is turned back ON after repair of the failure. This makes it possible to properly predict the tendency of failures or service lives, enabling highly accurate preventive maintenance.

INDUSTRIAL APPLICABILITY

The present invention described above is useful as an on-vehicle failure diagnosing method and apparatus which prevents the same failure details from being recorded as failure history data, even if the power source is cut OFF while a failure is present and the power source is turned back ON with the failure uncorrected, thus enabling correct failure history data to be stored.

What is claimed is:

1. An apparatus, for diagnosing a vehicle failure, comprising:

means for detecting a new failure;

means for storing a time of occurrence and details of said new failure, wherein said details include at least an indication of the new failure itself and one operating condition parameter which was present when the new failure was detected;

means for recalling details of any stored previous failure; and means for deciding whether to store the details of the new failure, wherein the decision as to whether to store the details of said new failure is based upon a comparison of the details of the new failure and details of at least one recalled previous failure, such that no new failure details will be stored if the details of the new failure match the details of any recalled previous failure, and the details of the new failure will be stored if the details of the new failure do not match the details of any recalled previous failure.

2. An apparatus, for diagnosing a vehicle failure, as claimed in claim 1, wherein:

said means for detecting said new failure comprises a failure detection circuit;

said means for deciding whether to store the details of said new failure comprises a failure diagnosis controller; and said means for storing the time of the occurrence and details of said new failure comprises a storage device.

3. An apparatus, for diagnosing a vehicle failure, as claimed in claim 2, said failure detection circuit comprising:

a line voltage failure detecting section;

a sensor failure detecting section;

an input section for a driving circuit output voltage; and an input section for a clutch system failure signal.

4. An apparatus, for diagnosing a vehicle failure, as claimed in claim 2, wherein said failure diagnosis controller comprises a microcomputer.

5. An apparatus, for diagnosing a vehicle failure, as claimed in claim 2, wherein said storage device is a device selected from the group consisting of a nonvolatile random access memory, a battery backed-up complementary metal-oxide-semiconductor random access memory, an integrated circuit card memory, and a hard disk device.

6. A method, for diagnosing a vehicle failure, comprising the steps of:

detecting a new vehicle failure;

determining a time of occurrence of said new failure;

determining details of said new failure, wherein said details include at least an indication of the new failure itself and one operating condition parameter which was present when the new failure occurred;

recalling details of any stored previous failure;

comparing the details of said new failure to the recalled details of the previous failure; and storing the details of said new failure only if the details of said new failure are different from the recalled details of the previous failure.

7. A method, for diagnosing a vehicle failure, as claimed in claim 6, wherein said new failure is detected upon turning ON a vehicle power supply.

8. A method, for diagnosing a vehicle failure, as claimed in claim 7, wherein said recalled details of the previous failure were stored upon a previous turning OFF of said vehicle power supply.

9. A method, for diagnosing a vehicle failure, comprising the steps of:

determining an occurrence of any previous failure;

recalling details of said previous failure, wherein said details include at least an indication of the previous failure itself and one operating condition parameter which was present when the previous failure occurred;

determining an absence of any new failures which have details matching the recalled details of said previous failure; and determining that a repair of said previous failure has occurred and normal operation has been restored.

10. A method, for diagnosing a vehicle failure, comprising the steps of:

turning ON a vehicle power supply;

detecting any new failure;

recalling details of any stored previous failure, wherein said details include at least an indication of the previous failure itself and one operating condition parameter which was present when the previous failure occurred;

determining that said new failure existed when said vehicle power supply was previously turned OFF by comparing details of the new failure with the recalled details of the previous failure; and determining to store details of said new failure only if the new failure has different details as compared to the recalled details of the previous failure.

11. A method, for diagnosing a vehicle failure, comprising the steps of:

determining an occurrence of any previous failure;

recalling details of said stored previous failure, wherein said details include at least an indication of said previous failure itself and one operating condition parameter which was present when said previous failure occurred;

determining a first time, which is an amount of time that elapsed, during which said previous failure was being detected;

determining a second time, which is an amount of time that elapsed, subsequent to storing said previous failure, during which there was the absence of detection of any new failures with details matching the recalled details of said previous failure; and determining that a repair of said previous failure has occurred when the second time is greater than the first time.

* * * * *